Figure 1:
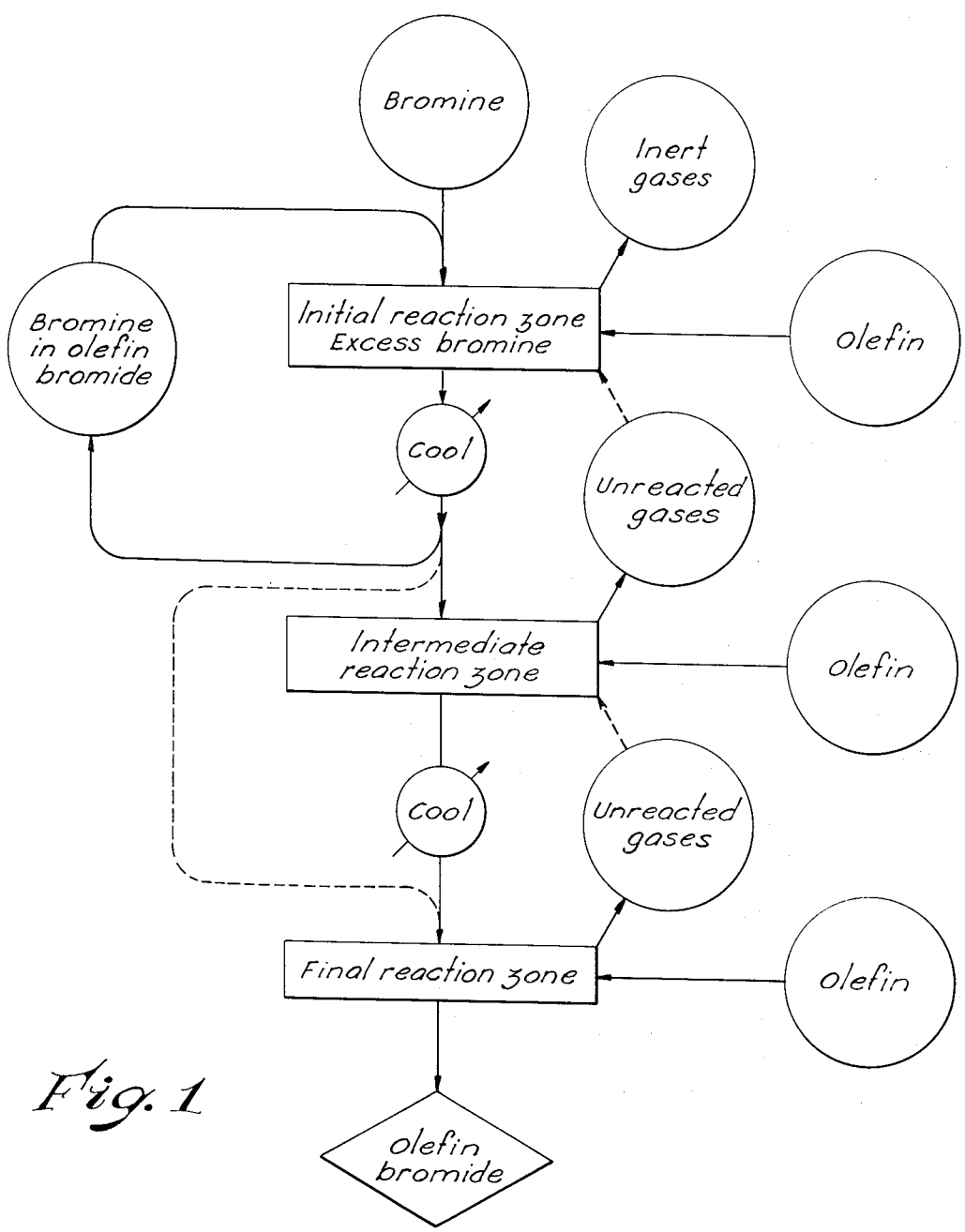

United States Patent Office 2,746,999
Patented May 22, 1956

2,746,999

PREPARATION OF OLEFIN BROMIDES

Albert A. Gunkler, Douglas E. Lake, and Bobby C. Potts, Midland, Mich., assignors to The Dow Chemical Company, Midland, Mich., a corporation of Delaware Application August 29, 1952, Serial No. 307,064

6 Claims. (Cl. 260—660)

This invention concerns an improved process for making olefin bromides by reaction of bromine with normally gaseous olefins. It permits the reaction to be carried out efficiently in a continuous manner with ready control of the reaction temperature and other reaction conditions and with little or no by-product formation to obtain the product directly in a form substantially free of unreacted bromine.

The usual procedure for making ethylene bromide by reaction of ethylene and bromine has been a batch procedure wherein ethylene gas is passed into a quantity of liquid bromine contained in a vessel provided with means for cooling the reaction mixture. Although practiced for a long time and on a large scale, this batch procedure has several inherent disadvantages. The reaction between ethylene and bromine is highly exothermic and requires careful removal of the evolved heat to avoid excessive temperatures which are hazardous, result in loss of materials, and which lower the quality of the product. The reaction rate in the batch process changes as the reaction proceeds, being slow to start, increasing as the concentration of ethylene bromide product accumulates in the reaction mixture, and decreasing again as the bromine concentration decreases near the end of the reaction. Such a variation in the rate of reaction not only imposes a variable load on the heat removal system, but results in large variations in the rate of absorption of the ethylene gas. Both at the beginning and at the end of the batch reaction, considerable ethylene often passes unreacted through the reaction mixture. Such inherent characteristics of the batch procedure require constantly changing processing conditions.

It is an object of this invention to provide a continuous method for the preparation of olefin bromides, particularly ethylene bromide. It is a further object of this invention to provide a method of reacting an olefin and bromine with one another at a uniform rate under substantially constant reaction conditions. Another object is to provide a highly efficient method of carrying out the addition reaction between bromine and a normally gaseous olefin, particularly ethylene, with the direct production of the corresponding olefin bromide, particularly ethylene bromide, free of unreacted bromine. Another object is to provide a method which permits effective control of temperature and removal of heat of the reaction. Other objects will be apparent from the following description of the invention.

These and other objects are attained by the process of this invention wherein bromine and gaseous olefin are continuously fed to a reaction system comprising a plurality of distinct reaction zones each containing a liquid olefin bromide as a reaction medium. Through one of these zones a solution of bromine in a liquid olefin bromide is circulated and a molecular excess of bromine is maintained over the olefin entering that zone. A part of the reaction mixture from the initial reaction zone is removed to a final reaction zone wherein there is maintained a molecular excess of olefin over the bromine in the liquid phase reaction mixture, and from that zone there is removed a bromine-free olefin bromide product. One or more intermediate reaction zones may be interposed between the initial and final reaction zones. This process can be better understood by reference to the drawing and to the detailed description to follow.

Figure 2:
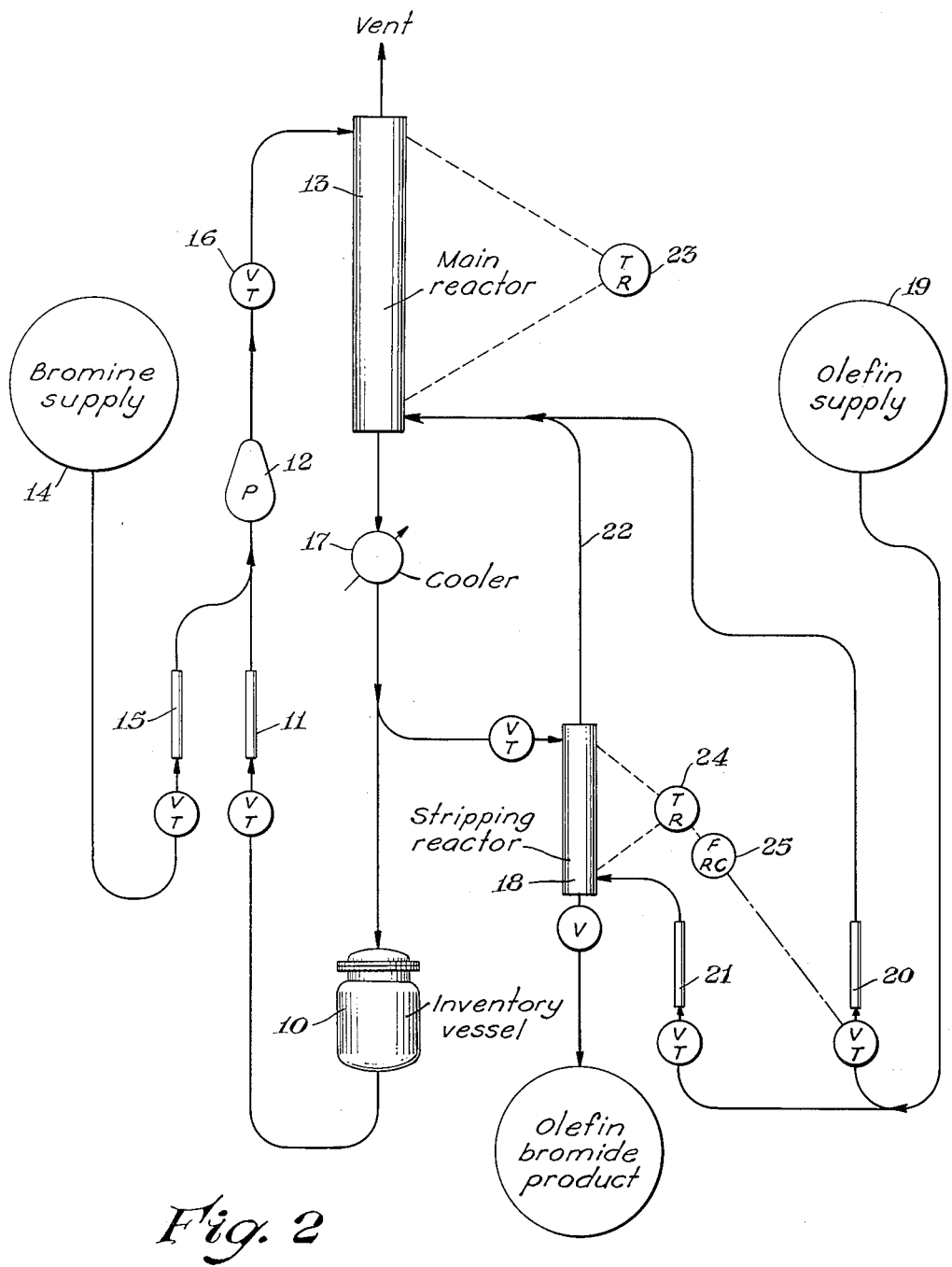

Figure 1 of the drawing is a flow sheet illustrating the flow of materials in the several stages of the process. Figure 2 is a diagrammatic sketch of an assembly of apparatus for carrying out the process.

In Figure 1 is indicated an initial reaction zone through which is continuously circulated a liquid solution of bromine in olefin bromide. To the initial reaction zone is fed bromine, which may be liquid bromine, bromine vapor or a solution of bromine in olefin bromide. To the initial reaction zone is also fed a portion of the stoichiometric amount of olefin gas. Because of the excess bromine constantly maintained in the initial zone, the olefin gas is almost completely reacted, only traces of olefin and inert gases passing through and out of the reaction zone. Heat generated by the reaction occurring in the initial reaction zone is absorbed as sensible heat of the components of the mixture and results in a rise in temperature. Said zone can be cooled, if desired, to withdraw part of the heat, but this is not necessary. The effluent from the initial reaction zone is passed through a cooler which extracts heat generated by the reaction and lowers the temperature of the recirculating stream. The major portion of the effluent from the initial reaction zone is, after cooling, recirculated as described. A minor portion of the cooled effluent from the initial reaction zone is passed to a final reaction zone, preferably at a rate such that the inventory of material in the circuit of the initial reaction zone is held substantially constant. The flow of reaction mixture from the initial to the final reaction zone may pass through one or more intermediate reaction zones as shown in Fig. 1, in each of which intermediate reaction zones the reaction mixture is contacted with a quantity of olefin less than that stoichiometrically equivalent to the free bromine in the reaction mixture entering the zone. However, such intermediate zones are not required and may be omitted. Heat generated by the reaction occurring in each intermediate reaction zone is preferably removed by passing the reaction mixture through a cooler before passing to the next zone. Olefin gas is passed into the final reaction zone at a rate in molecular excess of the free bromine in the liquid reaction mixture in that zone in solution in olefin bromide. In contact with a molecular excess of olefin, the free bromine is reacted and a substantially bromine-free olefin bromide product is removed from the final reaction zone. The unreacted gases from each reaction zone except the initial reaction zone are preferably fed to the immediately preceding reaction zone. Overall, stoichiometric proportions of olefin and bromine are reacted to produce an approximately equivalent amount of olefin bromide.

In any or all of the reaction zones the flow of liquid reaction medium containing bromine and the flow of olefin-containing gas may be either concurrent or countercurrent to each other, provided only that thorough contacting of the normally liquid phase and the normally gaseous phase is obtained under conditions conducive to the interreaction of bromine and olefin, except that, when the amount of bromine in the reaction mixture fed to the final reaction zone is greater than the stoichiometrical equivalent of the olefin being fed to that zone, the flow of liquid reaction mixture and the flow of olefin gas must be countercurrent to each other, and the reaction must be under such conditions that part of the bromine is vaporized and the amount of bromine remaining dissolved in the liquid reaction mixture is not greater than that stoichiometrically equivalent to the olefin entering the final reaction zone.

Fig. 2 is a diagrammatic sketch of an assembly of apparatus suitable for carrying out a simple two-stage embodiment of the process of this invention. The apparatus is preferably constructed of such materials that all surfaces in contact with bromine are of corrosion-resistant substances, such as nickel or corrosion-resistant metal alloys, glass, porcelain, ceramics or synthetic resins.

An inventory vessel 10 is charged with a mixture of bromine and a liquid olefin bromide of the kind to be produced. At a rate measured by a flow-meter 11, the mixture of bromine and olefin bromide from vessel 10 is pumped by pump 12 to a main reactor 13.

Bromine from supply source 14 is passed at a rate measured by a flow-meter 15 into mixture with the olefin bromide-bromine mixture being pumped by pump 12. A conventional flow control device 16 is provided on the discharge from pump 12.

The liquid effluent from reactor 13 is passed through a cooler 17. A major portion of the cooled effluent from cooler 17 is returned to the inventory vessel 10. A minor portion of the effluent from cooler 17 is passed to a stripping reactor 18. Cooler 17 may be supplemented by independent coolers, not shown, supplying additional cooling to the reaction mixture passing to the inventory vessel 10 and/or to the stripping reactor 18, or cooler 17 may be replaced by such independent coolers.

Olefin from supply source 19 is passed simultaneously into both the main reactor and the stripping reactor. At a rate measured by flow-meter 20, olefin is passed directly into the main reactor 13. Through flow-meter 21, olefin is also passed to the stripping reactor 18. Unreacted olefin passing through stripping reactor 18 may be carried via line 22 to the main reactor 13, or may be removed from the process, returned to storage, utilized elsewhere, or discarded. Inert and unreacted gases, if any, pass out of the main reactor 13 through a vent and are carried to a disposal system.

The liquid effluent from the stripping reactor 18 is essentially olefin bromide, substantially free of unreacted bromine. It is carried to storage or to other processing. The product may be cooled, treated with soda ash to remove traces of acidic substances and distilled to recover a purified olefin bromide.

The apparatus is equipped with appropriate valves, gauges, traps, and safety devices for its convenient operation. Temperatures in the main reactor 13 and the stripping reactor 18 may be observed by means of thermocouples connected to temperature recorders 23 and 24, respectively.

In the process of the invention, substantially constant rates of reaction between bromine and an olefin may readily be maintained in each of the two or more reaction zones. The reaction conditions in these zones are different from each other and are such as to provide for efficient utilization both of the olefin and of the bromine. In the initial or main reaction zone, the gases are subjected to contact with a concentration and molecular excess of bromine which reacts with the olefin in a highly efficient manner, and the effluent gases are substantially free of unreacted olefin. In the final or stripping reaction zone, bromine is subjected to contact with a relatively high concentration and large molecular excess of olefin which reacts with the bromine in a highly efficient manner, so that the effluent olefin bromide product is substantially free of unreacted bromine.

Although the process permits good control of the reaction conditions employed, its efficiency is not greatly reduced by occurrence of wide fluctuations in the rate of flow of materials to, or in, the reaction system. Over a long time of operation, a balance should be maintained between the amounts of bromine and olefin fed and olefin bromide removed from the system. However, momentary fluctuations in any of the process flow rates will not seriously upset the chemical balance of the system. For instance, if the olefin feed rate should suddenly be increased, there is a large excess of bromine in the main reaction zone to absorb the increased flow, and prevent the escape and loss of olefin. If the bromine flow rate increases, there is a large excess of olefin in the stripping zone to react with the increased bromine and prevent the escape of unreacted bromine into the product.

The principal effect of variations in feed rate of the reactants is to cause variations in the magnitude of temperature increase in one or another of the reaction zones. These variations in temperature rise can be detected and used advantageously to control the operating conditions and restore the balance of the system.

For example, in the two-stage process described in reference to Fig. 2, a change in the molar ratio of bromine to olefin in the main reaction zone, as a consequence of changing the rate of feed either of the bromine or of the olefin, would have the effect of changing the concentration of bromine in the effluent from the main reaction zone and hence in the feed to the stripping reaction zone. In the stripping reaction zone, in the presence of an excess of olefin, a change in the concentration of bromine in the feed to that zone results in a change in the amount of temperature rise occurring in that zone. As indicated in Fig. 2, the temperature recorder 24 on the stripping reactor 18 may be coupled with a flow-rate controller 25 to adjust the rate of flow of olefin to the main reactor 13. Alternatively, the variations in temperature rise across the stripping reactor 18 can be made to control the rate of bromine addition.

Changes in the rate of flow of olefin to the main reactor 13 have the additional effect of changing the amount of temperature rise across that zone and may be detected by the temperature recorder 23. Changes in temperature rise in the main reactor 13 can be made to change the rate of flow of bromine into the recirculating stream, to change the rate of circulation of the reaction mixture through the main reaction zone, cooler, inventory vessel and pump, or to change the rate of flow of olefin into the main reaction zone. Obviously, it would be undesirable to couple changes in temperature rise in both reaction zones to the same process variable. We prefer to hold the flow of bromine and the recirculation of the reaction medium at constant rates and to control the rate of flow of the olefin to the main reaction zone in accordance with changes in the amount of temperature rise which occur in the stripping reactor 18.

The concentration of bromine in the main reactor 13 should be at least that which will thoroughly scrub out and completely react with the olefin entering that zone, and may be as great as is desired after consideration of other factors. If the liquid-gas mixing in the main reaction zone is efficient enough, the concentration of bromine in the effluent from the main reaction zone may approach zero. Usually, a considerable excess of bromine is employed. Because the vapor pressure of bromine over a solution of bromine in a liquid olefin bromide increases with rise in temperature and with increasing concentration of bromine in the reaction mixture, the maximum allowable concentration of bromine in the olefin bromide in the main reaction zone depends on the allowable temperature rise, the maximum allowable temperature, and the tolerable loss of bromine by vaporization from the reaction mixture.

The concentration of bromine in the reaction mixture entering the main reactor 13 is a function of the rate of addition of bromine, the rate of circulation of the reaction medium and the concentration of bromine in the recirculating medium, i. e. the concentration of bromine in the effluent from the main reactor 13. The temperature rise in the main reactor zone, as a consequence of the reaction of olefin with part of the bromine, is a measure of the difference in concentration of bromine between the inlet and outlet of the main reactor, i. e., between the feed to and the effluent from the main reactor. The increase in temperature to be expected from the reaction of an olefin with bromine in solution in the corresponding olefin bromide may be calculated from thermodynamic data or may be observed experimentally. For the reaction of ethylene with bromine in ethylene bromide, there is a theoretical temperature rise of about 10 C.-degrees for an extent of reaction which reduces the concentration of bromine by one mole per cent in the reaction mixture. Since it is uneconomical to cool the effluent from the main reaction zone to a temperature much below 35° C., we have preferred to operate so that cooling below 35° C. is not required. Since bromine volatilization is appreciable at higher temperatures we have operated the main reactor so that the highest temperature in the main reaction zone is not above 100° C., and is preferably not over 85° C. We prefer to operate the main reactor so that there will be within that reactor a change in bromine concentration of about 2 to 6 mole per cent. For the reaction of ethylene with bromine in ethylene bromide, a change of concentration of bromine of 2 to 6 mole per cent is equivalent to a temperature rise of about 20 to 59 C.-degrees. To maintain these preferred conditions in the main reaction zone, a recirculation rate of about 15 to 50 pounds of reaction medium is required per pound of olefin bromide produced.

When intermediate reaction zones are employed the considerations are much the same as have been discussed relative to the initial reaction zone. We prefer to operate such intermediate reaction zones at temperatures not lower than 35° C. and not higher than 100° C. and to obtain therein a change in concentration of bromine of not more than 6 mole per cent in the liquid reaction mixture.

In the stripping or final reaction zone, it is necessary to operate under such conditions that a bromine-free product is obtained. We therefore operate so that there is a relatively large excess of olefin at least in the outlet region of the reactor. As in the other zones, we prefer to operate the final reaction zone at a temperature not below 35° C. and not above 100° C., preferably not over 85° C. We prefer to feed to the stripping reaction zone a reaction mixture comprising an olefin bromide and not more than 6 mole per cent bromine and to contact that reaction mixture with from 2 to 3 times or more the quantity of olefin theoretically necessary to react with that bromine. Under such conditions either concurrent or countercurrent flow of liquid olefin bromide-bromine reaction mixture and gaseous olefin may be employed. However, we have successfully operated the stripping reactor on a feed of ethylene bromide containing considerably more than 6 mole per cent bromine and produced a bromine-free product with a countercurrent flow of ethylene in amount stoichiometrically less than that of the bromine entering the stripping reactor. In this operation, the temperature of the reaction mixture rose rapidly in the region of feeding the ethylene bromide-bromine mixture, reaching the temperature at which the vapor pressure of the reaction mixture was greater than the reactor pressure, and part of the bromine boiled out of the reaction mixture and was returned to the main reactor. Part of the bromine in the reaction mixture in the stripping reactor was thereby vaporized by the heat generated by reaction of another part of the bromine with ethylene, and, as the reaction mixture moved through the stripping reaction zone countercurrently to the ethylene flow, the liquid reaction mixture contacted an increasingly large molecular excess of ethylene over the bromine in the liquid phase and was converted to a bromine-free ethylene bromide product. Heat necessary to boil the excess of bromine out of the stripping reaction zone could have been supplied from an external source, e. g. a heating jacket around the stripping reactor. The essential requirements in the final or stripping reaction zone are that the reaction conditions be such that the amount of bromine in solution in the liquid olefin bromide be not more than that stoichiometrically equivalent to the olefin in that zone, and that in the outlet region of the final reaction zone there be a molecular excess of olefin.

Because of the unmeasured loss of heat from the reaction zone by radiation and conduction, the actual observed changes in temperature will usually be somewhat less than the temperature differences theoretically calculated on a basis of the reaction which occurs. In the operation of the process with a given assembly of apparatus, these heat losses will usually be relatively constant, and the actual temperature differences as experimentally observed can be employed, instead of theoretical values, for complete and automatic control of the process.

The normally gaseous olefin hydrocarbons with which this invention is concerned are the lower mono-olefinic hydrocarbons which are gaseous at room temperature and pressure, e. g., ethylene, propylene, 1-butylene, 2-butylene, or mixtures thereof, and especially ethylene. For instance, the process can be applied in reacting bromine with propylene to obtain propylene bromide, in reacting bromine with 1-butylene to obtain 1,2-butylene bromide, and in reacting bromine with 2-butylene to obtain 2,3-butylene bromide, etc.

The invention will now be illustrated by means of an example, in which ethylene and bromine are reacted in the presence of ethylene bromide to form additional ethylene bromide. It may be pointed out that the invention is not to be limited by the particular example, and that many variations are possible as to the kind of olefin employed, the kind and size of apparatus used, and as to the operations performed, all within the spirit of this invention.

EXAMPLE

An apparatus, similar to that diagrammatically represented by Figure 2 of the drawing, was constructed in which the inventory vessel 10 was a 50-gallon kettle, the main reactor 13 was a six-inch-diameter vertical column about 14 feet long packed with five-eighths-inch Raschig rings, cooler 17 was a glass-lined heat-exchanger with about 26 square feet of heat-exchange surface, and the stripping reactor 18 was a three-inch-diameter vertical column about three feet long packed with one-fourth-inch Berl saddles. A solution of about 3.6 weight per cent bromine in ethylene bromide was circulated at a rate of about 4.1 gallons per minute from the inventory vessel 10 to the top of the main reactor column 13, from the main reactor column 13 through the cooler 17 and thence back to the inventory vessel. To this circulating stream of reaction medium, pure liquid bromine was fed at a rate which was experimentally varied from 125 to 170 pounds per hour.

A main stream of ethylene gas from supply 19 was passed into the main reactor column 13 at a rate which was experimentally varied from 20.7 to 25.7 pounds of ethylene per hour.

A portion of the reaction medium coming out of the cooler 17 was withdrawn as a side-stream from the recirculating stream and passed to the top of the stripping reactor column 18 at such a rate that ethylene bromide product was taken from the bottom of the stripping column at an average rate of about 200 pounds per hour. Variance between the rate of production of ethylene bromide in the main reactor 13 and the rate of transfer of reaction mixture to the stripping reactor 18 was compensated by corresponding variation in the inventory of reaction mixture in vessel 10.

Another stream of ethylene gas from supply 19 was passed at a rate equivalent to 3.2 pounds of ethylene per hour to the stripping reactor column 18. The unreacted ethylene gas from the stripping column 18 was joined with the main ethylene stream and fed to the main reactor column 13.

Analysis of the vent gases from the top of the main reactor column showed that approximately 98 to 99.5 per cent of the ethylene passed into the system had been consumed.

Analysis showed that the ethylene bromide reaction medium entering the top of the stripping column 18 contained from 3.2 to 4.6 weight per cent bromine. The ethylene bromide product taken from the bottom of the stripping column 18 was essentially bromine-free, i. e. substantially all of the bromine fed to the system was consumed.

Calculations based on these data indicate that in the main reactor column bromine was entering at a molecular rate approximately twice the molecular rate at which ethylene was entering the same column. Thus, the ethylene in the main column was exposed to about twice the amount of bromine theoretically necessary to react completely therewith.

Similarly, in the stripping reactor column, ethylene was entering at a molecular rate between two and three times that necessary to react completely with the bromine entering the column.

The temperature of the reaction medium leaving the cooler was about 50° C. From the top to the bottom of the main reaction column there was a temperature rise of about 25 C.-degrees. In the stripping reaction column a temperature rise of about 32 C.-degrees was observed.

The process was operated continuously, but from time to time certain flow rates were changed experimentally to new values which were held constant until equilibrium was established under the new conditions and one or more sets of readings were taken. Thus, each of these sets of conditions amounted to a test of the invention. These data are set forth in the table.

In the table, the rate of feed of bromine to the circulating stream of reaction medium is in pound-moles of bromine per hour. The rate of feed of ethylene to the reactors is in terms of the ethylene content of the ethylene-containing gas used in the process, i. e. in pound-moles per hour of actual ethylene. The bromine concentration in the feed to the stripping reactor and the concentration of bromine in the ethylene bromide product from the stripping reactor are in terms of mole per cent. The table also gives the actually observed temperatures and the temperature differences in both the main and stripping reactors for each test.

in the main reaction zone and a dilute ethylene-containing gas in the stripping zone.

The process is usually conducted in the presence of a trace of water, e. g. by the use of wet ethylene, since it has been observed that bromine and ethylene react somewhat more rapidly in the presence of a trace of water than when dry. Large amounts of water may cause formation of bromohydrins and other undesirable by-products and should be avoided.

Other modes of applying the principle of our invention may be employed instead of those explained, change being made as regards the method herein disclosed, provided the step or steps stated by any of the following claims or the equivalent of such stated step or steps be employed.

We claim:

1. In a continuous process for the preparation of olefin bromides by addition reaction between bromine and normally gaseous olefins, the improvement which comprises the steps of forming a liquid solution of bromine and an olefin bromide, circulating a stream of such liquid solution through an initial reaction zone and through a cooling zone, feeding bromine into that liquid solution at a rate such as to maintain therein uncombined bromine, feeding to the initial reaction zone a normally gaseous olefin in the form of a gas stream and at a rate insufficient to consume all of the bromine in the initial reaction zone, contacting the gas stream and the liquid solution of bromine in the initial reaction zone substantially to consume the olefin and to form thereby olefin bromide, withdrawing a portion of the stream of the liquid solution of bromine and olefin bromide from the cooling zone, passing that withdrawn portion to a final reaction zone, feeding a gas stream of a normally gaseous olefin to the final reaction zone at rate at least sufficient to consume all of the bromine in the final reaction zone, contacting the gas stream and the liquid solution in the final reaction zone substantially to consume the bromine and to form thereby olefin bromide, and withdrawing from the final reaction zone an olefin bromide product that is substantially free of unreacted bromine.

2. A method according to claim 1 wherein the olefin is ethylene and the olefin bromide is ethylene bromide.

3. In a method according to claim 1 wherein the por-

Table

| Test | Bromine, lb.-moles per hour | Ethylene, lb.-moles per hr. | | Bromine Concentration, Stripping Reactor, Mole Percent | | Ethylene Reacted, Percent | Ethylene Bromide Product, lb.-moles per hour | Temperatures, ° C. | | | | | |
|---|---|---|---|---|---|---|---|---|---|---|---|---|---|
| | | | | | | | | Main Reactor | | | Stripping Reactor | | |
| | | Main Reactor | Stripping Reactor | In | Out | | | Top | Bottom | Diff. | Top | Bottom | Diff. |
| 1 | 1.1 | 0.90 | 0.11 | 4.2 | 0.07 | 98.5 | 1.1 | 46 | 70 | 24 | 49 | 78 | 29 |
| 2 | 1.1 | 0.90 | 0.11 | 4.7 | .00 | 98.5 | 1.1 | 47 | 72 | 25 | 50 | 82 | 32 |
| 3 | 1.0 | 0.87 | 0.11 | 4.9 | .00 | 98.5 | 1.1 | 47 | 72 | 25 | 50 | 84 | 34 |
| 4 | 1.0 | 0.87 | 0.11 | 4.7 | .00 | 98.5 | 1.1 | 47 | 73 | 26 | 50 | 82 | 32 |
| 5 | 1.0 | 0.86 | 0.11 | 4.8 | .00 | 98.5 | 1.1 | 48 | 71 | 23 | 51 | 83 | 32 |
| 6 | .87 | 0.77 | 0.11 | 4.7 | .00 | 98.0 | 1.1 | 48 | 70 | 22 | 51 | 84 | 33 |
| 7 | .83 | 0.77 | 0.11 | 3.9 | .00 | 98.0 | 1.1 | 48 | 69 | 21 | 51 | 80 | 29 |
| 8 | .93 | 0.75 | 0.11 | 3.8 | .00 | 99.0 | 1.1 | 48 | 67 | 19 | 50 | 78 | 28 |
| 9 | 1.05 | 0.77 | 0.11 | 5.3 | .03 | 99.5 | 1.1 | 48 | 69 | 21 | 51 | 86 | 35 |

In order to produce the highest quality olefin bromide, it is preferable to use pure bromine and a pure olefin. The process of the invention is applicable, however, to bromine containing other substances, e. g. organic bromides, and to dilute olefin gases containing other substances, e. g. methane, ethane, nitrogen, or hydrogen, such as sometimes occur in olefins obtained from gas-cracking processes. We may also employ mixtures of olefins, e. g. of ethylene and propylene, to produce corresponding mixtures of olefin bromides. Also, we may use the same or different grades or concentrations of a particular olefin in the several reaction zones of the process. For example, in a process of making ethylene bromide, we may use a high concentration ethylene gas tion of the stream of liquid solution of bromine and olefin bromide that is withdrawn from the cooling zone is passed to a final reaction zone, the further steps of feeding the withdrawn portion of the stream of liquid solution of bromine and olefin bromide from the cooling zone to an intermediate reaction zone, feeding to that intermediate reaction zone a gas stream of a normally gaseous olefin at a rate insufficient to consume all of the bromine in that zone, contacting the gas stream and the liquid solution in the intermediate reaction zone to form a further amount of olefin bromide, withdrawing a stream of liquid solution comprising uncombined bromine from the intermediate reaction zone, and passing that stream to the final reaction zone.

4. A method according to claim 1 wherein the rate of feed of bromine corresponds to not more than 6 mole per cent based on the liquid stream entering the initial reaction zone and wherein the concentration of bromine in the stream of liquid solution of bromine and olefin bromide that is withdrawn from the cooling zone is not more than 6 mole per cent of that solution.

5. In a method according to claim 4, the further steps of withdrawing an effluent gas stream from the final reaction zone, feeding that gas stream into the initial reaction zone, and therein contacting the gas stream with the liquid solution substantially to consume the olefin from the gas stream and to form a further amount of olefin bromide.

6. A method according to claim 5 wherein the olefin is ethylene and the olefin bromide is ethylene bromide.

References Cited in the file of this patent

UNITED STATES PATENTS 2,547,139    Randall ---------------- Apr. 3, 1951

FOREIGN PATENTS 661,788    Great Britain ----------- Nov. 28, 1951
1,011,929  France ------------------ Apr. 9, 1952